United States Patent [19]

Knothe et al.

[11] 4,153,126
[45] May 8, 1979

[54] PARALLEL CONSTRUCTION FOR A TOP-LOADING BALANCE

[75] Inventors: Erich Knothe, Bovenden; Christoph Berg, Göttingen; Eberhard Stadler, Göttingen; Hans-Heinrich Köhne, Göttingen, all of Fed. Rep. of Germany

[73] Assignee: Sartorius-Werke GmbH (und vorm. Göttinger Präzisionswaagenfabrick GmbH), Göttingen, Fed. Rep. of Germany

[21] Appl. No.: 885,590

[22] Filed: Mar. 13, 1978

[30] Foreign Application Priority Data

Mar. 11, 1977 [DE] Fed. Rep. of Germany ....... 2710788

[51] Int. Cl.² .................... G01G 21/24; G01G 7/02
[52] U.S. Cl. .................................... 177/229; 177/212
[58] Field of Search ............... 177/229, 212, 210 EM

[56] References Cited

U.S. PATENT DOCUMENTS 4,062,416 12/1977 Berg .................................. 177/229 X Primary Examiner—Joseph W. Hartary
Attorney, Agent, or Firm—Browdy and Neimark

[57] ABSTRACT

A parallel construction, particularly for a top-loading balance with electromagnetic force compensation, has two essentially identical, preferably trapezoidal, movable guides in parallel horizontal planes. The guides are mounted permanently at one end and connected together by a movable rigid connecting element at the other end. The two guides are displaced relative to one another in their planes at right angles to their axis of rotation.

13 Claims, 4 Drawing Figures

PARALLEL CONSTRUCTION FOR A TOP-LOADING BALANCE

FIELD OF THE INVENTION

The present invention relates to a parallel construction connected to a pan and a measuring part, for a top-loading balance, with two essentially identical movable guides in mutually parallel planes, said guides being permanently mounted and connected together by a movable rigid connecting element.

BACKGROUND OF THE INVENTION

Parallel constructions with two different guides are already known, whereby one of the two guides is generally made narrower and incapable of accepting lateral forces (U.S. Pat. No. 3,148,742, cited in German Utility Model 71-15,570). A similar function is provided in the parallel construction according to Swiss Pat. No. 525,476, wherein two cross-brace joints are provided above and one below. In such asymmetric guides, however, only one guide form can be disposed optimally relative to accepting forces in various directions, while the second guide can fulfill its function only partially. Consequently, the accuracy of the parallel construction suffers. In addition, two different parts must be manufactured, stored and (in the event of repair) brought along, which should be avoided for space and cost reasons.

Hence, parallel constructions with two identical guides have been developed, whereby the articulations form the corners of a rectangle. A design of this kind has been proposed, for example, for a electromagnetically compensating, beamless force-measuring or weighing device in U.S. Pat. No. 4,062,416. Such parallel constructions are known, with two identical guides, from U.S. Pat. No. 3,877,532 or German Utility Model 71-15,570. The articulations are generally formed by thin leaf springs or appropriate thin places on the arms.

In addition, an E-shaped guide geometry is known from U.S. Pat. No. 3,191,702, wherein the ends of the two outer tabs of the guides are permanently mounted, while the movable, rigid connecting element is mounted on the end of the middle tab of the guides. Hence, the entire guide is made in the form of a spring. The two guides of the parallel construction are again mounted vertically one above the other.

Hence, the guides must be screwed from above or below to a system support, in other words to an additional element, which can only then be connected (for example by screwing), to the housing, especially the bottom plate of the balance. Admittedly, U.S. Pat. No. 3,191,702 indicates a direct support of the parallel construction on a part of the housing; in this case, however, the fastening screws are difficult to reach; moreover, screwing points must be used which are less stable because they are projecting.

SUMMARY OF THE INVENTION

Hence, an object of the present invention is to provide a parallel construction for a top-loading balance of the species indicated above, wherein the above-mentioned disadvantages do not occur.

In particular, a parallel construction is proposed which can be mounted simply and consists of only a few different parts.

This is accomplished according to the present invention by virtue of the fact that the two guides are mounted in their respective planes, at right angles to their axis of rotation (i.e. in the cross-section plane of FIG. 1), displaced relative to one another.

Hence, this design allows two identical guides to be used so that, on the one hand, extremely accurate parallel construction will be provided and, on the other hand, simplification of mass production and stocking of supply or replacement parts will be facilitated. Moreover, the fastening points of the two guides on the fixed supporting part are readily accessible from the same side, so that both assembly and repair of these parts are considerably simplified. Finally, despite the simplification, an extremely compact design is produced.

Advantageously, the guides are trapezoidally shaped, viewed from above (according to U.S. Pat. No. 4,062,416). Then the fastening screws for the guide in the lower plane can be reached without having to remove the upper guide, due to the relative displacement of the trapezoidal guides. Moreover, both forces and torques can be accepted by the guides.

A further considerable simplification of manufacturing assembly is achieved if no additional fastening element is provided for the guides on the fixed part of the balance, but the fixed mounting of the guides is achieved by a part of the housing. The bottom of the balance lends itself particularly well to this purpose.

In this case, the fixed support for the two guides can be made in the form of a wall, said wall being provided with slots for the height adjustment of a guide, for example the upper guide; in this manner, the vertical distance between the two guides can be adjusted with considerable accuracy. The change in the width of the slots and hence the height adjustment can be carried out with adjusting screws, whereby extremely small and hence exact changes in the slot width and hence in the heights of the guides are possible.

Advantageously, holes are provided at the ends of the slots, so that no crack formation will be engendered by changes in the slot width as a result of the notch factor.

Second slots can be provided parallel to the first slots, so that ridges will be provided between the upper edges of the wall and the second slot as well as between the two slots. These ridges form a type of parallel construction since the wall part to which the guide is fastened rotates minimally during adjustment.

Although a parallel construction of this kind can be used in various types of top-loading balances, it is especially suited for a balance with electromagnetic force compensation.

BRIEF DESCRIPTION OF THE DRAWINGS

The present invention is described below with reference to an embodiment and referring to the enclosed schematic drawing.

DETAILED DESCRIPTION OF PREFERRED EMBODIMENTS

Figure 1:
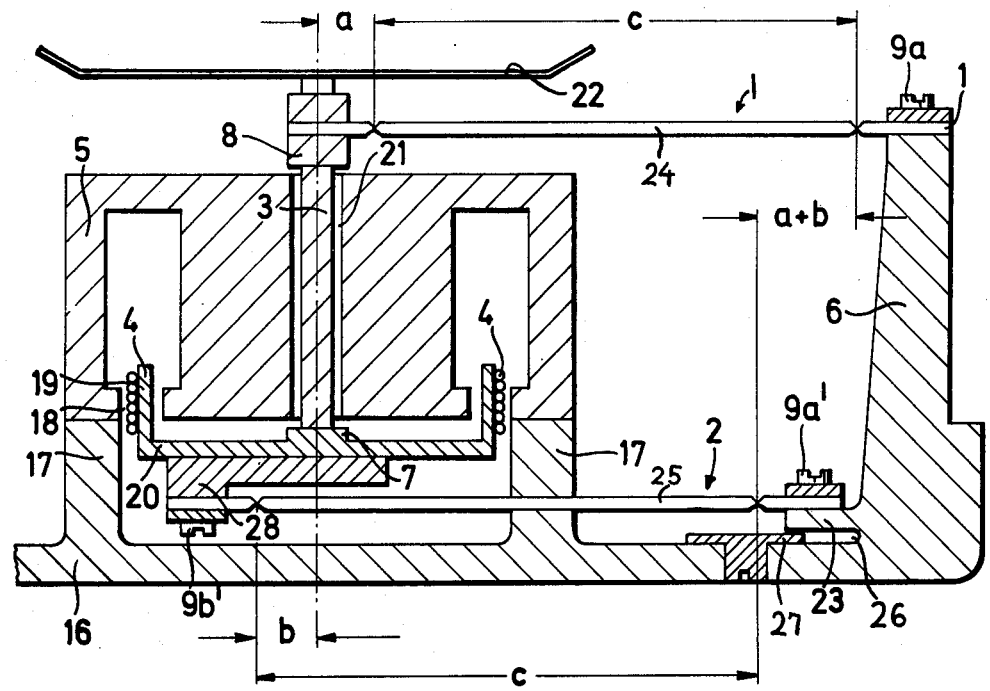
FIG. 1 is a side elevation of a parallel construction according to the present invention for a top-loading balance with electromagnetic force compensation.

As is particularly clear from FIG. 1, a top-loading balance provided with a parallel construction according to the present invention is provided with a magnet arrangement which is in the form of a pot magnet 5. Pot magnet 5 is mounted rotationally symmetrically about its main lengthwise axis.

Pot magnet 5 rests upon projections 17 in the base plate 16 of the balance housing, and is therefore permanently mounted relative to the balance.

In the vicinity of its lower end, pot magnet 5 is provided with an annular air gap 18, in which a working coil 4 is movably mounted. Working coil 4 is disposed on a coil body 20, said body being firmly connected to a connecting element 3. The same arrangement but with an air gap on the upper end of the pot magnet is also possible.

Connecting element 3 is made in the form of a rigid rod and extends through a hole 21 in pot magnet 5. The diameter of connecting element 3 increases above and below pot magnet 5, so that stops 7 and 8 to limit the travel of connecting element 3 are produced above and below.

As an alternative to the embodiment shown here, the connecting element can also be made C-shaped, and fit around the outside of pot magnet 5. In this case, no hole for pot magnet 5 is required. An embodiment of this kind is described in U.S. Pat. No. 4,062,416.

A pan 22 is mounted at the upper end of connecting element 3, so that connecting element 3 can move downward when a load is placed on pan 22. However, this is prevented in known fashion by the electromagnetic force compensation, with a current being transmitted through the working coil 4, generating a counter force of equal magnitude. The current flowing through working coil 4 is then a measure of the applied mass.

The parallel construction of connecting element 3 is provided by two guides 1 and 2, disposed in two mutually parallel horizontal planes. Upper guide 1 is mounted permanently on the rear wall 6, made integral with base plate 16 of the balance housing by screws 9a, while its other end is fastened against stop 8 of connecting element 3 by screws 9b, said stop projecting at the top of pot magnet 5 (see particularly FIG. 2).

Lower guide 2 is likewise permanently mounted on housing wall 6, specifically along a step 23 at the transition between base plate 16 and side wall 6. The other end of lower guide 2 is mounted on a projection on a plate 28, said plate being connected to coil body 20. In this case, too, fastening is by screws 9a' and 9b'.

As shown particularly in FIG. 1, the length of the two guides 1 and 2 between the articulations c indicated schematically by the two notches is the same, i.e., the two guides are of equal length. The distance between the left articulation of upper guide 1 and the central axis of connecting element 3 is a, while the distance between the left articulation of lower guide 2 and the middle axis of connecting element 3 is b.

The horizontal distance between the two right-hand articulations of the two guides 1 and 2 is therefore a plus b. The two guides 1 and 2 are therefore displaced relative to one another in their planes at right angles to the axes of rotation passing through the two articulations (i.e., in the plane of the drawing of FIG. 1).

Figure 2:
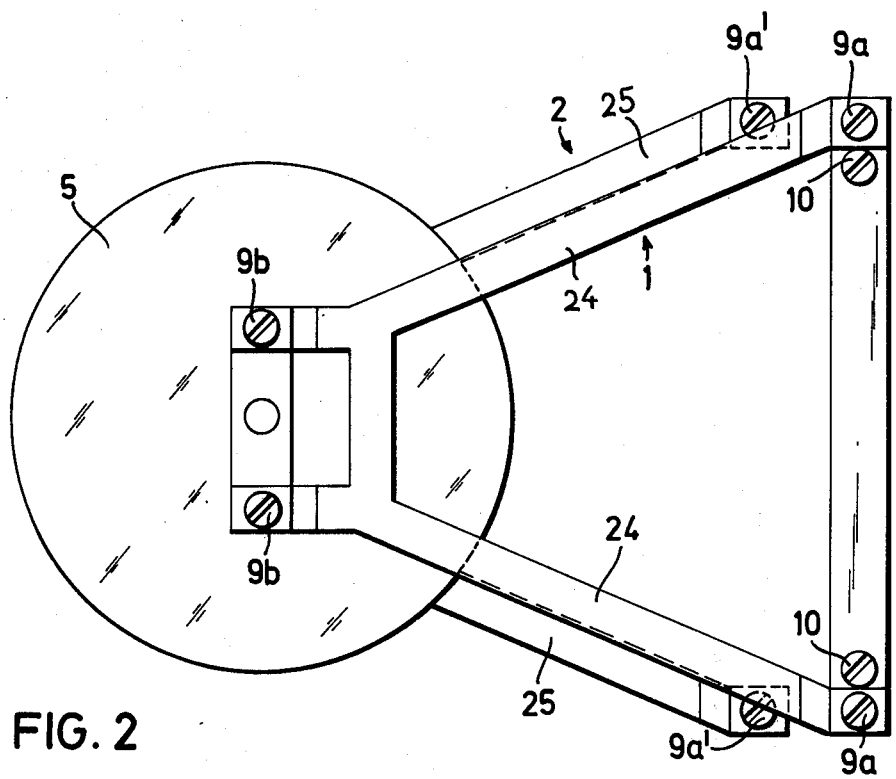
FIG. 2 is a top view of the parallel construction according to FIG. 1 whereby only the important parts are shown.

As is shown in particular in FIG. 2, the two guides 1 and 2 are arranged trapezoidally. Thus, due to their mutual displacement, their arms 24 and 25, as viewed from above, are located side by side. The fastening points of arms 25 of lower guide 2, indicated by screws 9a', are therefore as accessible from above as the corresponding screws 9a of upper guide 1. The same is true of guides arranged in a triangular manner.

Figure 3:
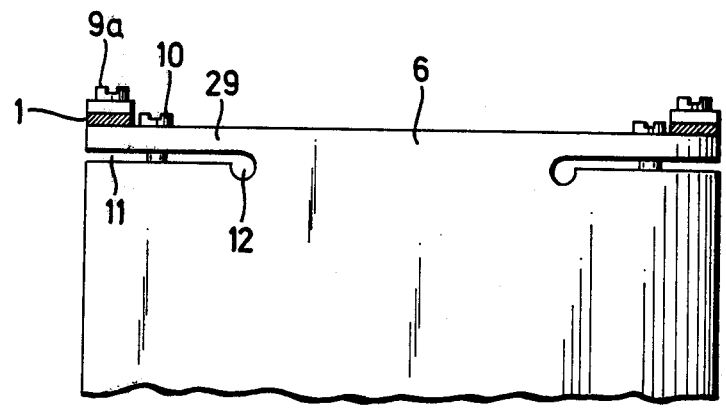
FIG. 3 is a rear view of the housing part which serves as a fixed mount for the two guides.
Figure 4:
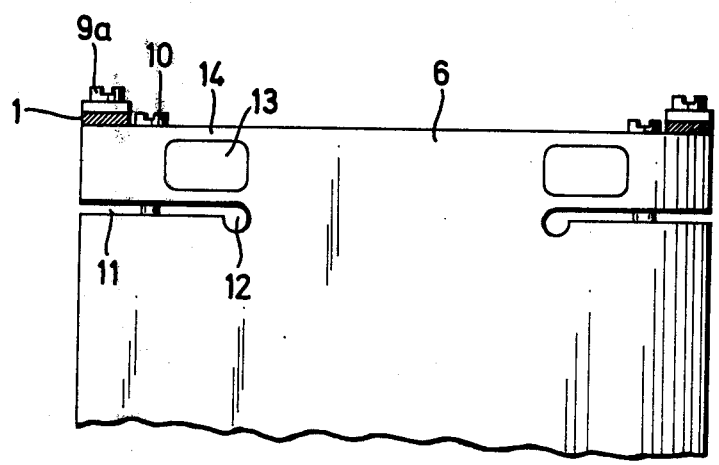
FIG. 4 is a rear view of a modified embodiment of this housing part.

An advantageous embodiment of the mounting of the guides on housing wall 6 is shown for the upper guide 1 in FIGS. 3 and 4, which shows a rear view of rear housing wall 6. Upper guide 1 is fastened by screw 9a to a corner point on housing wall 6. At a slight distance from housing wall 6, and parallel to the latter, a slot 11 is provided with left end open, while its right end is formed by a bore 12. An adjusting screw 10, disposed near screw 9a (see also FIG. 2) extends for example through a bore in ridge 29 between the upper edge of housing wall 6 and slot 11. The lower end of adjustment screw 10 engages a threaded hole below the surface of slot 11. In another embodiment, adjusting screw 10 is accepted in a threaded hole in ridge 29 while its lower end rests upon the lower surface of slot 11.

By turning adjusting screw 10, the width of slot 11 can be changed, with ridge 29 being pushed away from or advanced toward the lower surface of slot 11. In this manner, height adjustment of upper guide 1 can be carried out.

Another embodiment of the height adjustment is shown in FIG. 4, wherein an additional opening 13 is provided between the upper edge of the wall 6 and slot 11; this produces a ridge 14, between additional opening 13 and the upper edge of wall 6 as well as a ridge 15 between additional opening 13 and slot 11.

The two ridges 14 and 15 form a type of parallel construction so that the end area of the housing wall, to which upper guide 1 is fastened, rotates minimally during height adjustment.

The hole 12 provided at the end of the slot in the two embodiments prevents crack formation as a result of the notch factor.

The step 23, which serves as a fixed mounting for lower guide 2, can also be provided with a slot 26, into which a wedge-shaped disc 27 can be inserted. This allows a fine adjustment of the vertical distance between the two guides 1 and 2 by widening slot 26.

It will be obvious to those skilled in the art that various changes may be made without departing from the scope of the invention and the invention is not to be considered limited to what is shown in the drawings and described in the specification.

What is claimed is:

1. In a parallel construction for a top-loading balance having a housing, comprising two essentially identical movable guides in mutually parallel horizontal planes, said guides being mounted permanently at one end thereof and connected together by a movable rigid connecting element at the other end thereof, the improvement wherein said guides are displaced relative to one another in their planes at right angles to their axis of rotation.

2. Parallel construction according to claim 1, wherein said two guides are provided with articulations in both end areas thereof.

3. Parallel construction according to claim 1, wherein said guides are made flexible for the entire length thereof.

4. Parallel construction according to claim 2, wherein the articulation of said upper guide located in the vicinity of the permanent mount, is displaced by a distance a+b relative to the corresponding articulation of said lower guide, wherein a is the distance between the central axis of said connecting element and the articulation in the vicinity of said connecting element for said upper guide and b is the distance between the articulation for said lower guide, located in the vicinity of said connecting element, and the central axis of said connecting element.

5. Parallel construction according to claim 1, wherein said guides are made triangular.

6. Parallel construction according to claim 1, wherein said guides are made trapezoidal.

7. Parallel construction according to claim 1, wherein the permanent mounts of both of said guides is formed on a portion of the balance housing.

8. Parallel construction according to claim 1, wherein the permanent mount is formed on a wall, at least one of said guides being mounted on the end surfaces of said wall.

9. Parallel construction according to claim 8, wherein slots, parallel to the ends of said wall, are provided for adjustment of the vertical distance between said two guides.

10. Parallel construction according to claim 9, further including an adjusting screw means for changing the width of said slot.

11. Parallel construction according to claim 9, wherein an additional opening is provided between said slot and the end surfaces of said wall.

12. Parallel construction according to claim 9, wherein said slot is open at one end thereof while a bore is provided at the other end thereof.

13. Parallel construction according to claim 1, wherein the balance is a top-loading balance with electromagnetic force compensation.

* * * * *